A. B. CALKINS.
SPLINT BOXING MACHINERY.
APPLICATION FILED AUG. 14, 1906.

916,666.

Patented Mar. 30, 1909.
6 SHEETS—SHEET 1.

WITNESSES:

INVENTOR
Almon B. Calkins
BY
Chapin & Hayward
his ATTORNEYS

A. B. CALKINS.
SPLINT BOXING MACHINERY.
APPLICATION FILED AUG. 14, 1906.

916,666.

Patented Mar. 30, 1909.
6 SHEETS—SHEET 4.

WITNESSES:
INVENTOR

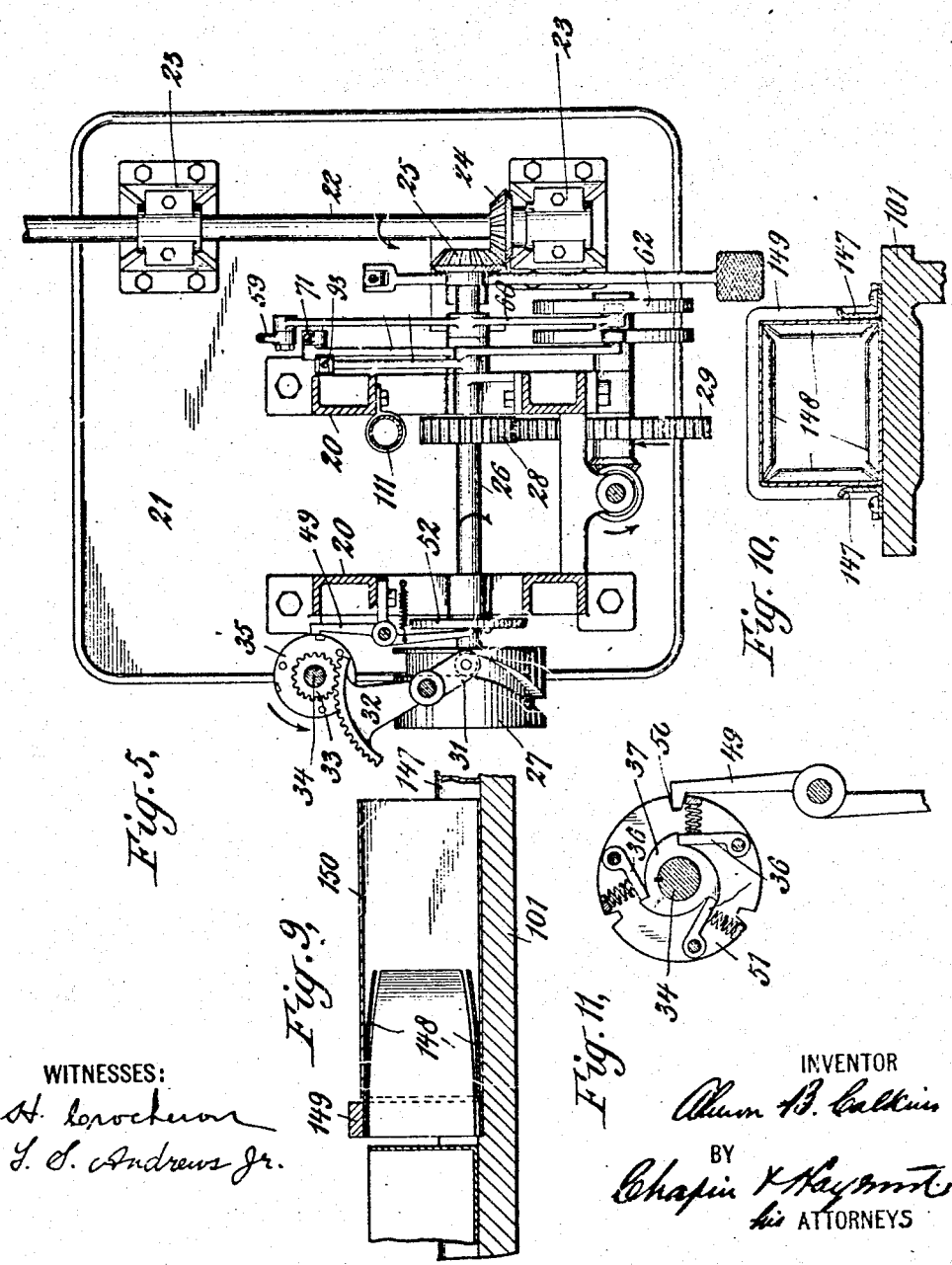

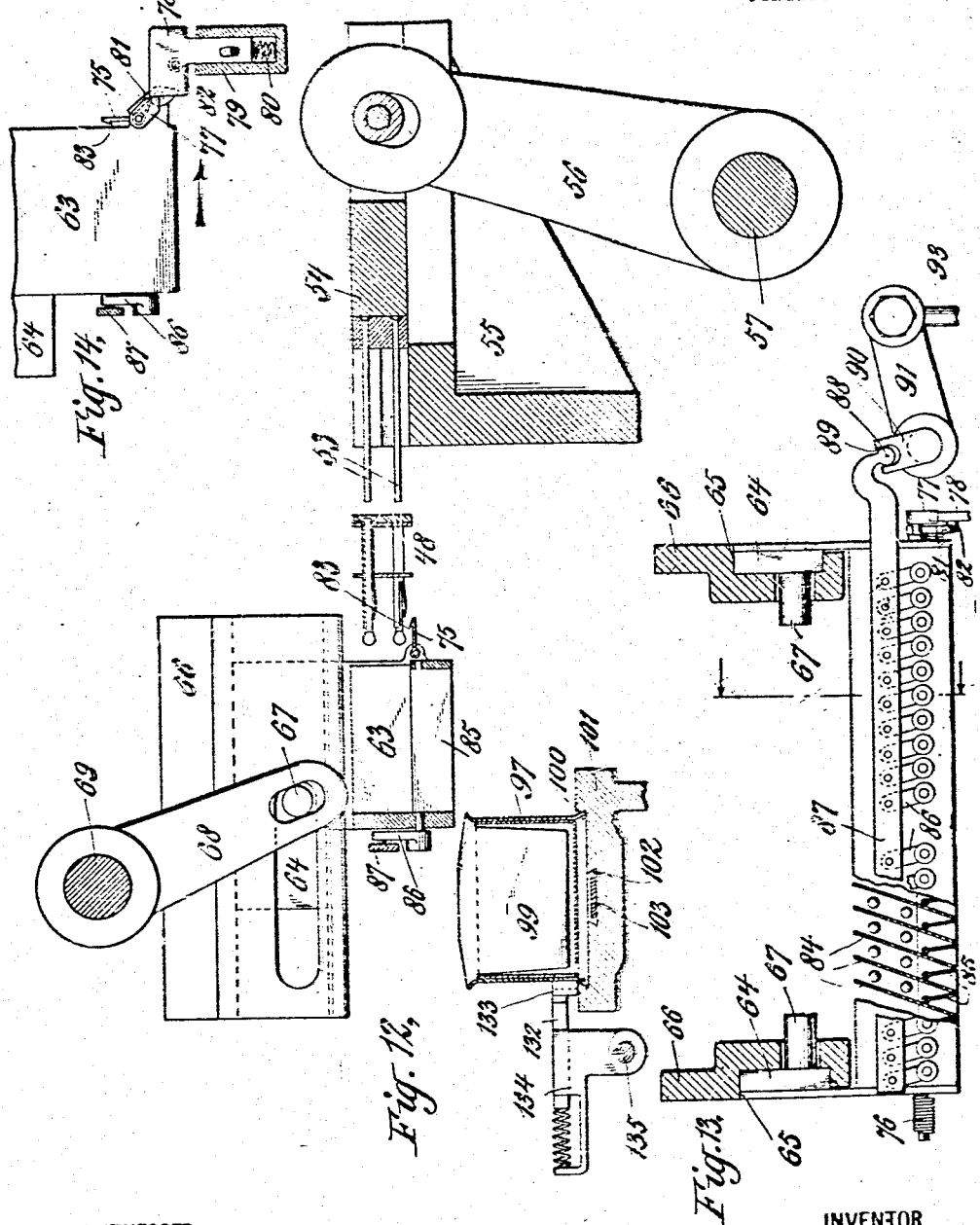

UNITED STATES PATENT OFFICE.

ALMON B. CALKINS, OF BELLEVILLE, NEW JERSEY.

SPLINT-BOXING MACHINERY.

No. 916,666.  Specification of Letters Patent.  Patented March 30, 1909.

Application filed August 14, 1906. Serial No. 330,554.

*To all whom it may concern:*

Be it known that I, ALMON B. CALKINS, a citizen of the United States of America, and resident of Belleville, county of Essex, State of New Jersey, have invented certain new and useful Improvements in Splint-Boxing Machinery, of which the following is a specification, reference being had to the accompanying drawings, forming a part thereof.

My invention relates to splint boxing machinery, and particularly to means employed in connection with match making machinery for unloading the finished matches and packing them in predetermined quantities in boxes.

My invention consists in many novel combinations of parts and details of construction, having for their main object the positive delivery of a predetermined quantity of splints or matches into boxes automatically moved into position to receive them, the said splints delivered and packed evenly in the said boxes. Careful provision is also made against the possibility of accidental ignition of the splints, and means is also provided whereby the mechanism may be quickly and readily adjusted for the purpose of delivering different predetermined quantities in the individual receiving boxes, as may be desired.

In order that my invention may be fully understood, I will now proceed to describe an embodiment thereof with reference to the accompanying drawings illustrating same, and will then point out the novel features in claims.

Figure 1:
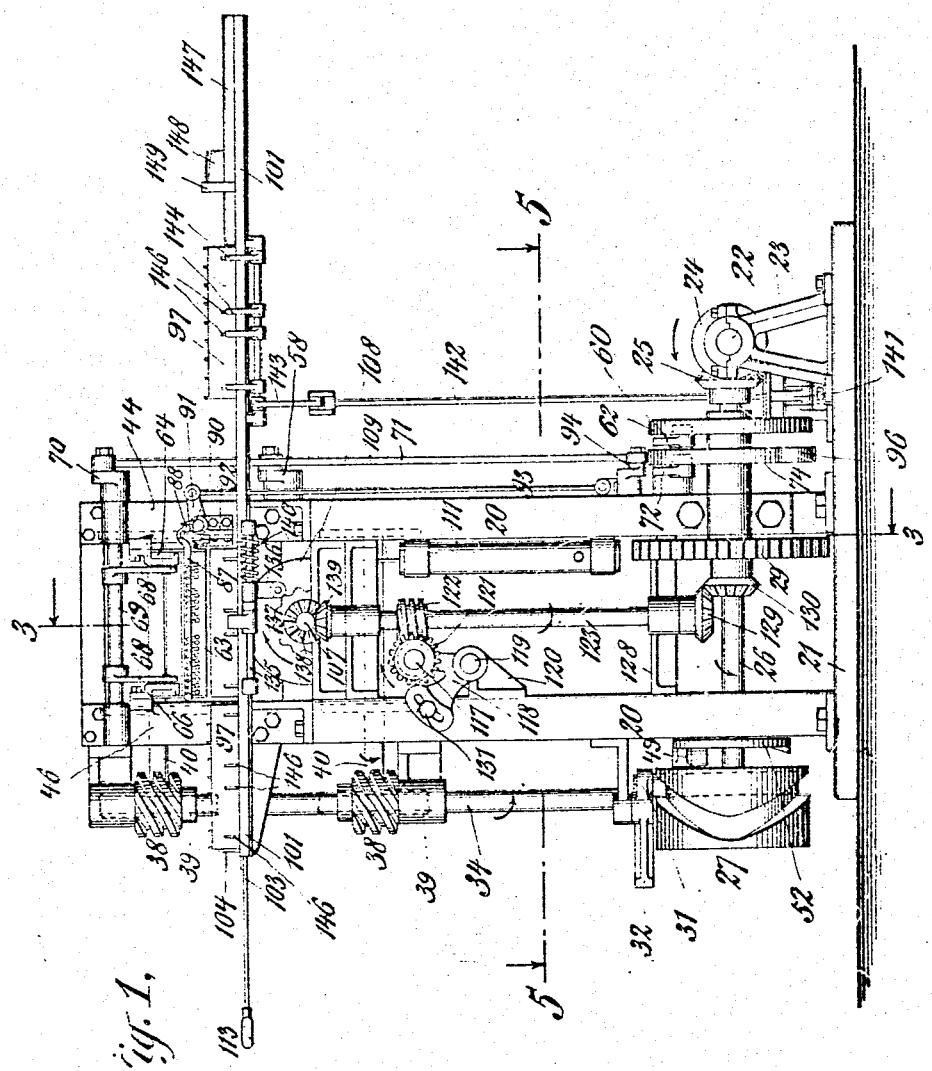
Figure 2:
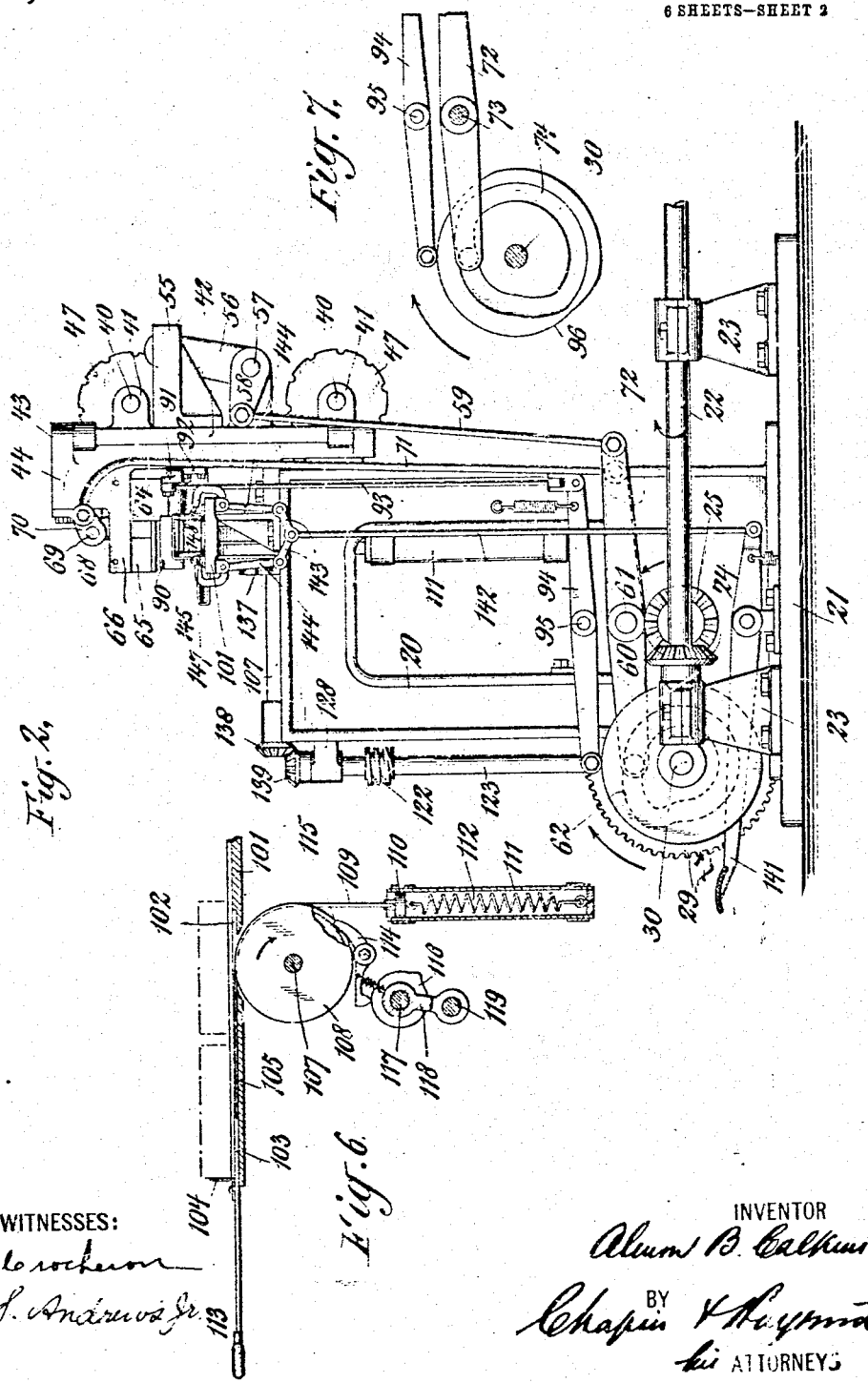
Figure 3:
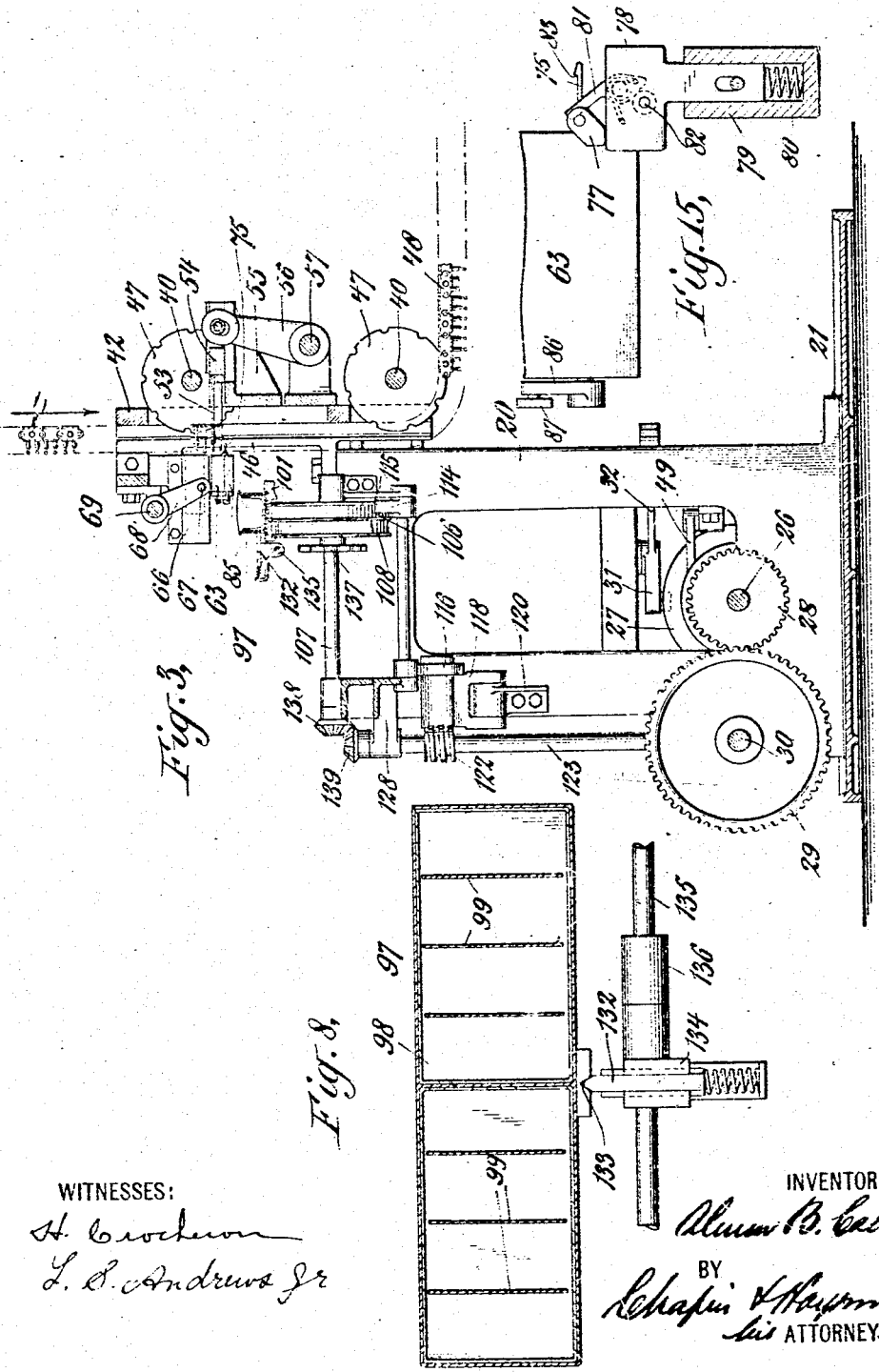
Figure 4:
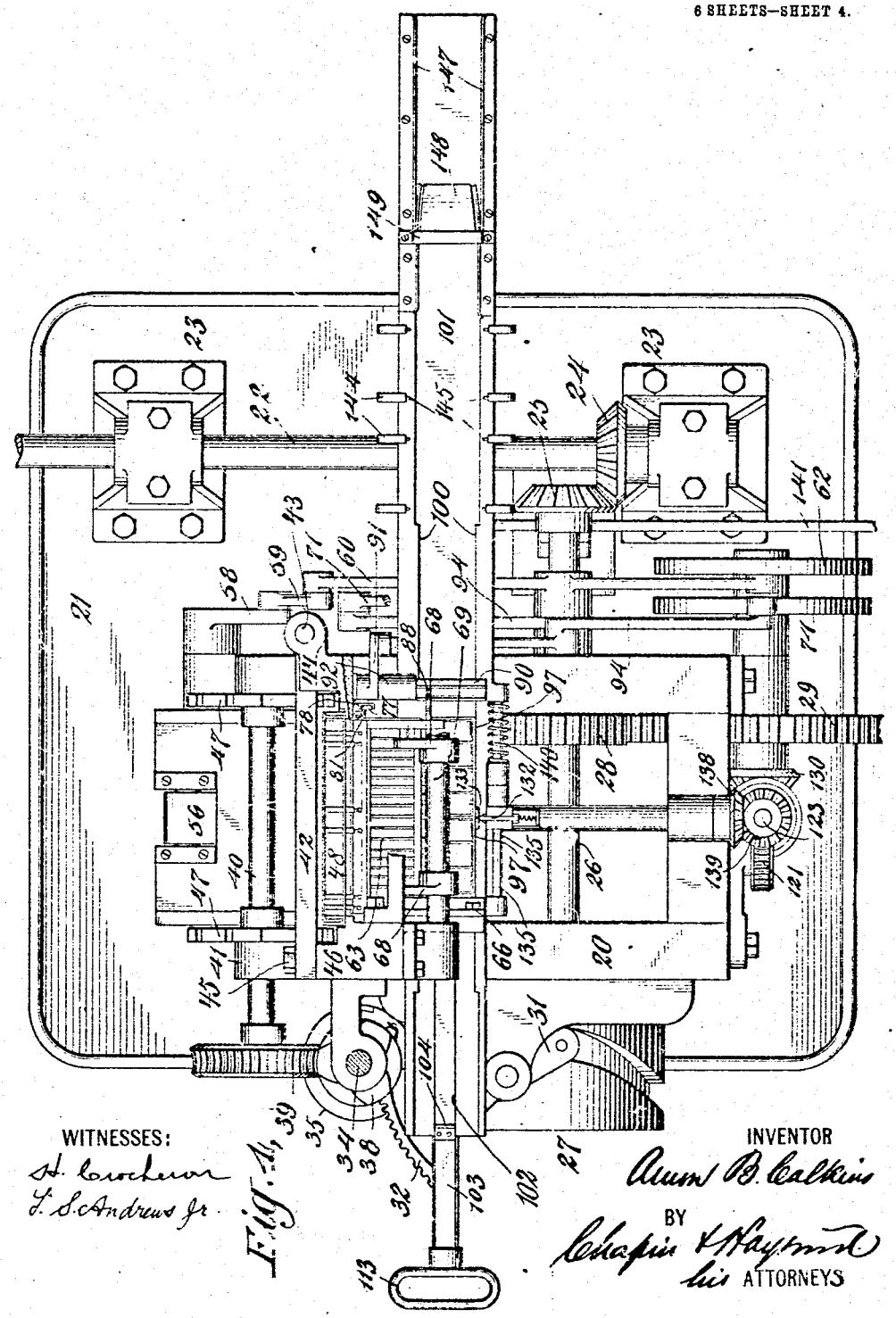

In the drawings—Figure 1 is a view in front elevation of the machine. Fig. 2 is a view in side elevation of the same. Fig. 3 is a view in transverse vertical section therethrough, the plane of section being substantially upon the line 3—3 of Fig. 1. Fig. 4 is a top view of the machine with certain parts broken away. Fig. 5 is a view in horizontal section of the same, the plane of section being substantially upon the plane of the line 5—5 of Fig. 1. Fig. 6 is a detail view of certain parts, including the means for timing the operation of the box carrier, and for moving empty boxes into position in the machine. Fig. 7 is a detail view of certain cams employed for reciprocating the conveyer and operating the discharge doors thereof. Fig. 8 is a detail top view in partial horizontal section of a box carrier and certain mechanism employed for centering and vibrating same. Fig. 9 is a detail view in central longitudinal section through a guiding means employed for assembling the filled boxes and the tubes or covers arranged to surround them. Fig. 10 is a transverse sectional view of the same. Fig. 11 is a detail transverse sectional view of the vertical shaft through which step by step movements are transmitted to the splint carrying devices, and of certain correlated parts. Fig. 12 is a detail view on an enlarged scale in transverse vertical section, showing the ejecting means for the splints, the intermediate conveyer and the receiving box carrier. Fig. 13 is a detail view showing particularly the intermediate conveyer and the means for operating the discharge doors therefor. Fig. 14 is a detail view, showing particularly the tripping mechanism for the admission door of the intermediate conveyer. Fig. 15 is a detail view on an enlarged scale, of certain of the parts shown in Fig. 14, but showing them in different relative positions.

Referring to the drawings by reference characters, 20 designates the side frames of the machine and 21 the base plate thereof.

22 is the main driving shaft, journaled in suitable bearings 23 upon the base plate 21, the said shaft carrying a miter gear 24, which meshes with a similar miter gear 25 upon a cam shaft 26. The cam shaft 26 is journaled in bearings in the main frame of the machine, and in addition to carrying the cam 27, which serves to impart step by step movements to the splint carrying devices, is provided with a pinion 28, through which, by connection with a spur gear 29, it imparts rotary movements to an intermediate shaft 30. The cam 27 engages a cam follower carried by an arm 31 of a quadrant 32, said quadrant arranged in mesh with a pinion 33, which is mounted loosely upon a vertical transmitting shaft 34, but to which is rigidly secured a disk 35. The disk 35, carries a plurality of pawls 36, said pawls arranged to engage the teeth of a ratchet wheel 37, which is mounted fast upon the vertical transmitting shaft 34. The said pawls 36 and the ratchet wheel 37 appear clearly in Fig. 11 of the drawings, the disk 34 carrying them being, however, removed in order to show the parts which are arranged immediately beneath same. The disk appears in Fig. 5, the supporting pins for the said pawls being also indicated in this figure. The cam 27, in its rotation, imparts reciprocating movements to the sector 32, and hence to the pinion 33, but as the pawls 36 will only actively operate upon the ratchet wheel 37 and the shaft 34 in one direction, the said reciprocating movements of the pinion 33 result in step by step movements of the shaft 34 always in the same direction, periods of rest alternating with the said step by step movements. The vertical shaft 34 carries worms 38, which engage worm wheels 39 upon horizontal shafts 40. The horizontal shafts 40 are mounted in bearings 41 in a frame member 42, which is pivotally connected at 43 to a bracket 44 secured to one of the side frames 20, and forming a part of the main frame of the machine. At the side of the frame member 42, opposite to its pivotal connection 43, it is secured by means of a bolt or bolts 45 to another bracket 46, similar to the bracket 44. The shafts 41 carry sprocket wheels 47, which support and drive a splint carrier 48, which may conveniently be in the form of an endless chain. This carrier 48 passes down at the front of the swinging frame member 42, the side edges thereof being guided between said frame member and portions of the brackets 44 and 46.

It will be noted that immediate access may be obtained to the carrier chain, and the said carrier chain may be immediately freed from its engagement with other parts of the machine by merely loosening the bolt or bolts 45 and swinging the frame member 42 upon its pivot 43. The worm wheels 39 and worms 38 will readily disengage, and may be as readily reëngaged when the frame member is swung around into position again.

In order that the chain carrier may be held positively against movement during the periods of rest intermediate the step by step movements imparted thereto, I have provided a locking device comprising a dog 49, arranged to engage notches 50 in a disk 51, which is fast upon the shaft 34, the said dog 49 being operated at the proper time by means of a cam 52 upon the cam shaft 26. The cam 51 operates to release the dog 49 from engagement with a notch 50 upon the initial movement of the shaft 34, but permits the said dog to engage another notch at the termination of the feeding movement of the said shaft, and to remain in engagement with such notch so as to positively lock the shaft 34 against movement during the entire return movement of the disk 35 and pinion 33.

Means are provided for ejecting certain of the splints carried by the splint carrier during the time the said splint carrier is held thus stationary. This ejecting means comprises a plurality of plungers 53 carried by a plunger head 54. Said plunger head is mounted to reciprocate in vertical ways in a bracket 55, secured to the frame member 42, the plungers 53 being disposed in a line with one or more rows of the splints carried by the said splint carrier (see Fig. 3). The plunger head 54 is operated by means of an arm 56 mounted upon a rock shaft 57, to which is also secured another arm 58. The said arm 58 is connected by means of a connecting rod 59 with an operating lever 60 fulcrumed at 61 and engaged by a cam 62 upon the intermediate shaft 30. The cam 62 is constructed and timed to give a rapid forward and backward movement to the plunger head 50 while the carrier chain is at rest, whereby splints in a line with the said plungers will be ejected. The splints thus ejected are arranged to be received by a receiving conveyer 63, which is mounted and arranged to be horizontally reciprocated in front of the carrier chain 48 and in line with the plungers 53. The said conveyer is suspended from slides 64 mounted in guideways 65 in brackets 66 secured to the frame brackets 44 and 46. The slides 64 are provided with trunnions 67, which are engaged by arms 68 mounted upon a rock shaft 69. The said rock shaft 69 is journaled in suitable bearings upon the frame brackets 44 and 46, and at one end carries an operating arm 70, which is connected by means of a connecting rod 71 with an operating lever 72. Said operating lever is fulcrumed at 73 to the side frame 70, and is engaged by a cam 74 upon the intermediate shaft 30. The cam 74 is constructed and timed to reciprocate the conveyer immediately after the plungers have operated to eject the splints from the chain carrier.

Referring now particularly to Figs. 12, 13, 14 and 15, which illustrate the conveyer and its operating mechanism on an enlarged scale, it will be seen that the said conveyer is provided with a door or gate 75, which is pivoted at the rear thereof in proximity to the point at which the splints are admitted. In Fig. 12 the said door or gate is shown in a horizontal or open position, while in Fig. 14 it is shown in a vertical or closed position. The door is arranged to be in its horizontal or open position when the conveyer is brought back to receive the splints, and is arranged to be closed immediately upon the forward movement of the conveyer, after the splints have been received thereby. The said door or gate is shown as provided with a spring 76, which normally exerts a pressure thereon to close it. A dog 77, which is secured to the said door or gate, is, however, engaged by a cam piece 78, during the rearward movement of the conveyer 63, by which the said door or gate is forced open during such rearward movement, and held open while the said rearward movement is completed. The cam piece 78 is mounted in a housing 79, secured stationary in the machine, the said cam piece being held in its normal operative position by means of a spring 80 mounted in the said housing and pressing upwardly against said cam piece, the said spring forming a yielding means by which the cam piece may be forced downward when desired. The conveyer 63 carries a detent 81 spring or gravity held in the position in which it is shown in Fig. 14. A portion of this detent 81 is arranged horizontally in line with a pin 82 which projects laterally from the cam piece 78. When the said conveyer 63 is moving rearwardly, i. e., in the direction of the arrow of Fig. 14, the detent will engage the said pin 82, but will pass over same, being permitted to turn on its axis by yielding of its spring. The conveyer moves to a distance sufficient to allow the detent to pass clear to the opposite side of the pin 82. When the conveyer 63 begins to move in the opposite direction, the detent will operatively engage the pin 82, the said detent being prevented from turning upon its support in the direction in which pressure will now be applied. The detent then will act as a cam to force the cam piece 78 downward against the upward pressure of its spring 80, and will so force it down to a degree sufficiently to release the dog 77, so as to allow the door or gate 75 to quickly snap shut. This quick movement of the door or gate is desirable, for the reason that thereby the said gate may be caused to act upon the rear of the splints to impart a slight blow thereto, so as to enforce their completely entering the conveyer. In other words, in case the plungers fail to force the splints all the way into the conveyer, the action of the said door or gate will be such as to complete the necessary movements thereof. It will be noticed that the upper or outer end of the door or gate has a slight shoulder 83, such shoulder being for the purpose of preventing the splint ends from passing the upper or outer edge of the said door or gate, should they have a tendency to ride up the inner surface of the same during its closing movement.

The conveyer is divided into a plurality of compartments (see particularly Fig. 13), there being preferably as many compartments as there are splints in a row. The present conveyer is particularly designed for receiving the splints from two rows at a time, and by reason of the fact that the splints in consecutive rows in the carrier are staggered with respect to adjacent rows, the walls of the said compartments are made slanting, as at 84. Each compartment is provided with a discharge door 85, which extends obliquely across the discharge end of said compartment, but which is pivoted against the compartment wall, and may be swung about its pivot, so that it will lie flat alongside the said wall to allow free egress of the splints to the discharge opening. The pivot pins of these discharge doors penetrate to the exterior of the conveyer, and are each provided with operating arms 86, each in turn pivotally connected with a horizontal bar 87. The said horizontal bar 87 terminates in a cylindric key 88, which is fitted to ways 89 in an arm 90. The said arm 90 is secured to, or formed as a part of, an operating arm 91, pivotally mounted upon a bracket 92 and connected by means of a connecting rod 93 with a lever 94 fulcrumed at 95 and engaged by a peripheral cam 96. The said cam 96 is arranged upon the periphery of the disk in which is the crown cam 74, which operates to reciprocate the conveyer, as above set forth. The cam 96 is so positioned and timed as to open the discharge doors 85, after the conveyer has been moved to the limit of its movement away from the carrier chain 48, at which time the said conveyer will be in a position immediately over a box or boxes arranged to receive the splints.

The boxes are introduced into the machine, and are supported in position therein, by means of carriers 97. One of these carriers is shown in horizontal section in Fig. 8, the said carrier being arranged to receive and support two boxes therein. The carriers may be arranged, of course, to support a single box, or any number of boxes, as may be desired. The said carrier comprises side and end walls, together with one or more partitions 98, in case more than one box is to be supported thereby, and it is also provided with separating plates 99, of which there may be a plurality for each box supported. These plates 99 are preferably secured to the side walls at points above the edges of the box or boxes to be supported in the carrier, as will be readily understood by reference to Fig. 12. The lower edges of the side walls are arranged to flare outwardly, whereby they will form projecting tongues, which may be fitted to ways 100 in a table 101. The table 101 is secured to the side frames 20 of the machine, and overhangs same for some distance on either side. Mounted in a central groove 102, in the said table 101, is a slide 103, said slide having an abutment 104 arranged to engage an end wall of a box carrier 97. A cord or strap 105 is connected to the slide 103 at its inner end, said cord or strap passing over the pulley 106, and being secured at its opposite end thereto. The pulley 106 is mounted loosely upon a horizontal shaft 107, and secured to the said pulley 106 is another pulley 108. A strap 109 passes around the pulley 108 and is secured thereto at one end, its opposite end being attached to a plunger 110, which is mounted in a cylinder 111. A spring 112 is connected at one end to the plunger 110 and at the other end to the bottom of the cylinder 111, said spring acting to exert constant tension upon the cord or strap 109, so as to revolve the pulleys 106 and 108 in the direction of the arrow, Fig. 6. The piston or plunger 110 and cylinder 111 act as a dash pot or air check device to preright) upon the table 101, or it may rest until pushed farther along by still another box carrier being inserted and fed along upon the table of the machine, in any event, the said box carrier, finally arriving at the position in which one of said carriers is shown in Fig. 1. When in this position, a treadle 141 may be depressed, such treadle connected by means of a connecting rod 142 and links 143 with rocker arms 144, which are provided with sharp pointed pins 145 arranged to pass through slots or openings 146 in the walls of the box carriers 97, and to enter the box or boxes carried thereby. Thus upon depression of the treadle 141, the box or boxes within the box carrier 97, at that moment opposite the said fingers, will be engaged by said fingers, and will be held firmly thereby to permit the box carrier to be lifted up and removed from the table 101. The boxes will now rest freely upon the table 101, except for their engagement by the pins of said rocker arms, and the carrier may have fresh empty boxes inserted therein, and be used over again. The table 101 is provided at points immediately in advance of the box or boxes as they are now resting upon a table, with side guides 147 and with spring fingers 148 secured to an arch 149. The arch and spring fingers 148 are arranged of such size as to just permit the filled boxes to pass therethrough, while the said fingers are arranged to contract slightly, that is to say, they deflect inwardly toward the right, and tubes or box covers 150 are guided toward them between the side guides 147, the said tubes or box covers surrounding the free ends of the said fingers and receiving the fingers within them. The fingers 148 then form guides by which the boxes may be readily inserted into the tubes or covers, the operator pushing the filled boxes forward with one hand, from left to right, and inserting the tubes into position with the other hand from right to left. When the boxes are forced into the tubes, the tubes and boxes may be removed together, and will then be ready for shipment. The rocker arms being operated by a treadle, the hands of the operator will be entirely free to manipulate the boxes and covers, so that the operation of holding and releasing the boxes will in no way interfere with the manual manipulation thereof. The parts just described, relating to the inserting of the boxes into the tubes, will be best understood by reference to Figs. 1, 4, 9 and 10.

From the foregoing, it will be seen that I have devised means whereby splints or matches may be positively discharged from a carrier and positively inserted in predetermined quantities in boxes automatically fed into the machine for the purpose. The exact predetermined quantity will be inserted into the boxes, and this quantity may be varied exactly in accordance with such predetermination. It will also be seen that I have provided for the rapid disposition of the boxes after they are filled, and for the ready assembling of the same with their tubes or covers.

What I claim is:

1. In splint unloading and boxing apparatus, the combination with a splint carrying means adapted to present splints in a substantially horizontal position, of horizontally reciprocating ejectors therefor, a conveyer arranged to receive splints ejected thereby, means for horizontally reciprocating said conveyer toward and away from the carrying means, and means operated independently of the movement of the conveyer for discharging splints therefrom.

2. In splint unloading and boxing apparatus, the combination with splint carrying means adapted to present splints in a substantially horizontal position, of ejecting means therefor, a conveyer arranged to receive splints ejected thereby, said conveyer provided with means for closing the opening through which the splints are received, means for horizontally reciprocating said conveyer toward and away from the carrying means, and means operated by the movement of the conveyer for causing the operation of said closing means.

3. In splint unloading and boxing apparatus, the combination with a horizontally reciprocating conveyer arranged to receive splints presented horizontally thereto, of plungers for forcing the splints into the conveyer, and means other than the plungers for imparting a blow to the splints at the rear thereof to force the completion of their movement into the conveyer.

4. In splint unloading and boxing apparatus, the combination with a horizontally reciprocating conveyer arranged to receive splints presented horizontally thereto, of plungers for forcing the splints into the conveyer, and means other than the plungers for imparting a blow to the splints at the rear thereof to force the completion of their movement into the conveyer, said means comprising a hinged door or gate provided with a shoulder at its free end.

5. In splint unloading and boxing apparatus, the combination with a horizontally reciprocating conveyer arranged to receive splints presented horizontally thereto, of plungers for forcing the splints into the conveyer, and means other than the plungers for imparting a blow to the splints at the rear thereof to force the completion of their movement into the conveyer, said means comprising a door or gate pivotally carried by the said carrier, spring means tending to move the same from a substantially horizontal to a substantially vertical position, and means operated by the movement of the conveyer to trip the said door or gate.

6. In splint unloading and boxing apparatus, the combination with a horizontally reciprocating conveyer arranged to receive splints presented substantially horizontally thereto, and means for laterally reciprocating same toward and from a source of supply, a door or gate 75 pivoted to the rear of said conveyer, a spring tending to close said door or gate, cam means operating during the movement of the conveyer in one direction to hold the said door or gate open, and a trip adapted to release the said door from engagement with the cam upon the movement of the carrier in the other direction.

7. In splint unloading and boxing apparatus, the combination with a horizontally reciprocating conveyer, means for laterally reciprocating same toward and from a source of supply, and means for presenting splints horizontally thereto, of a door or gate 75 pivoted to the rear of said conveyer, a spring tending to close said door or gate, a dog 77 secured to said door or gate, a cam piece 78 arranged in the path of movement of said dog, a trip 81 arranged to engage a portion fast with said cam, and spring means whereby said cam will yield when engaged by said trip in one direction, said cam piece arranged to engage and operate the dog 77 when the conveyer is moving in the other direction.

8. In splint unloading and boxing apparatus, the combination with a horizontally arranged conveyer, said conveyer divided into compartments by oblique walls, and having angularly arranged doors closing the lower end of said compartments, of means for horizontally reciprocating the said conveyer, and means for simultaneously operating all said doors to discharge splints received therefrom.

9. In mechanism of the class described, the combination with a horizontal conveyer for splint unloading and boxing apparatus, divided into a number of compartments by a plurality of obliquely arranged walls, and provided with a plurality of discharge doors arranged obliquely across the lower ends of said compartments, each pivoted in proximity to the under side of one wall, and arranged to swing over toward the upper side of the opposite wall, of means for laterally reciprocating same toward and away from a source of supply.

10. In splint unloading and boxing apparatus, the combination with a horizontally arranged conveyer divided into compartments by oblique walls, and having obliquely arranged discharge doors for closing the lower ends of said compartments, means for horizontally reciprocating said conveyer toward and away from a source of supply, means for presenting splints thereto when the conveyer is in one position, and means operating to open the discharge doors in any predetermined position of the conveyer independent of the movement of the conveyer as a whole.

11. In splint unloading and boxing apparatus, the combination with a horizontal conveyer 63 divided into compartments by oblique walls 84 and provided with swinging discharge doors 85, of operating means for said discharge doors comprising arms 86, a bar 87, an operating arm 90 having a sliding engagement with said bar 87, so that it will be in operative engagement therewith in any position of the conveyer, means for operating the arm 90 at predetermined intervals of time, and means for horizontally reciprocating the said conveyer.

12. Splint unloading and boxing apparatus comprising a reciprocating conveyer adapted to receive and discharge splints, a box carrier, a stationary slideway in which said carrier is mounted, yielding means for feeding said box carrier along said slideway to a position to receive splints from the conveyer, means for normally holding said box carrier against such feeding movement, and a trip operated after a predetermined interval of time to release said holding means.

13. Splint unloading and boxing apparatus comprising a reciprocating conveyer adapted to receive and discharge splints, a box carrier, a stationary slideway in which said carrier is mounted, means in abutting relation with said box carrier for feeding same along said slideway, means for receiving said box carrier from the feeding means and for holding the same when the feeding means is moved away therefrom, and means for moving said feeding means away from said box carrier for a new feeding operation.

14. Splint unloading and boxing apparatus, comprising a reciprocating conveyer adapted to receive and discharge splints, a box carrier, a stationary slideway in which said carrier is mounted, means for feeding said box carrier along said slideway to a position to receive splints from the conveyer, and a spring finger for engaging said box carrier when it is moved to said receiving position.

15. Splint unloading and boxing apparatus, comprising a reciprocating conveyer adapted to receive and discharge splints, a box carrier, a stationary slideway in which said carrier is mounted, means for feeding said box carrier along said slideway to a position to receive splints from the conveyer, a spring finger for engaging said box carrier when it is moved to said receiving position, and means for laterally vibrating the said spring finger.

16. Splint unloading and boxing apparatus comprising a reciprocating conveyer adapted to receive and discharge splints, a table arranged beneath the path of movement of the conveyer, a slide having an abutment fitted to said table, a box carrier arranged to slide in ways upon said table, and adapted to be engaged by the abutment of said slide, yielding means for feeding forward the said slide, a stop for holding back said slide, and tripping means for releasing the said stop.

17. Splint unloading and boxing apparatus including a table having ways, a plurality of box carriers fitted to slide in said ways, yielding means arranged to receive and hold a box carrier in a position to receive splints, and means automatically controlled for feeding another box carrier to the position of the first said box carrier, and thereby ejecting the first said carrier from its position.

18. Splint unloading and boxing apparatus including a table having ways, a plurality of box carriers fitted to slide in said ways, a spring finger arranged to engage said box carriers when in a position along said ways to receive splints, spring actuated means for feeding the box carriers along said ways, a stop engaging said spring actuated means, and a trip for disengaging said stop.

19. Splint unloading and boxing apparatus including a table having ways, a plurality of box carriers fitted to slide in said ways, a spring finger arranged to engage said box carriers when in a position along said ways to receive splints, means for laterally vibrating said spring finger, spring actuated means for feeding the box carriers along said ways, a stop engaging said spring actuated means, and a trip for disengaging said stop.

20. In splint unloading and boxing machinery, the combination with a table and box carriers arranged to travel along same, of means for engaging boxes carried by a box carrier, whereby the box carriers may be removed from engagement with the boxes, said box carriers constructed with openings for the said engaging means and with open bottoms for freeing the boxes, substantially as set forth.

21. In splint unloading and boxing apparatus, the combination with a table and box carriers arranged to move along the table, of treadle mechanism and fingers operated thereby to grasp the boxes contained in the box carriers to hold the said boxes stationary while the box carriers are being removed, said box carriers constructed with side openings for the fingers, and with open bottoms, substantially as set forth.

22. Carriers for splint unloading and boxing apparatus comprising side and end walls, the said side walls provided with outwardly flaring portions 100 and having slots or openings 146 laterally therethrough; and separating plates 99 secured to the side walls at their upper corners only, substantially as set forth.

ALMON B. CALKINS.

Witnesses:
H. W. NELOH,
GEO. W SYMONDS.